(12) United States Patent
Minami et al.

(10) Patent No.: US 11,387,510 B2
(45) Date of Patent: Jul. 12, 2022

(54) NON-AQUEOUS ELECTROLYTE SECONDARY BATTERY

(71) Applicant: TDK CORPORATION, Tokyo (JP)

(72) Inventors: Takamasa Minami, Tokyo (JP); Kazuma Akimoto, Tokyo (JP); Hideaki Seki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 178 days.

(21) Appl. No.: 16/977,051

(22) PCT Filed: Mar. 22, 2019

(86) PCT No.: PCT/JP2019/012081
§ 371 (c)(1),
(2) Date: Aug. 31, 2020

(87) PCT Pub. No.: WO2019/182110
PCT Pub. Date: Sep. 26, 2019

(65) Prior Publication Data
US 2021/0043885 A1    Feb. 11, 2021

(30) Foreign Application Priority Data

Mar. 23, 2018   (JP) .............................. JP2018-056887

(51) Int. Cl.
*H01M 4/00* (2006.01)
*H01M 50/124* (2021.01)
(Continued)

(52) U.S. Cl.
CPC ....... *H01M 50/124* (2021.01); *H01M 10/058* (2013.01); *H01M 50/116* (2021.01); *H01M 50/543* (2021.01)

(58) Field of Classification Search
CPC ............ H01M 50/124; H01M 50/116; H01M 50/543; H01M 10/058
See application file for complete search history.

(56) References Cited

U.S. PATENT DOCUMENTS

2017/0274622 A1    9/2017  Amano et al.

FOREIGN PATENT DOCUMENTS

| JP | 2000-353502 A | 12/2000 |
| JP | 2007-294382 A | 11/2007 |

(Continued)

OTHER PUBLICATIONS

Jun. 18, 2019 International Search Report issued in International Patent Application No. PCT/JP2019/012081.

*Primary Examiner* — Jane J Rhee
(74) *Attorney, Agent, or Firm* — Oliff PLC

(57) ABSTRACT

A non-aqueous electrolyte secondary battery in which a potential of a metal layer in an exterior body is kept noble, and corrosion can be suppressed, including: a power generation element wherein a positive electrode and a negative electrode are opposed to each other with a separator interposed therebetween, and the negative electrode is disposed on an outer side than the positive electrode; and an exterior body which covers the power generation element, and has a metal layer and a resin layer which covers both surfaces of the metal layer, and an average thickness t1 of a first part of the exterior body which covers upper and lower surfaces of the power generation element in a lamination direction of the power generation element and an average thickness t2 of a second part of the exterior body which covers side surfaces of the power generation element satisfy a relationship of t2/t1<0.995.

12 Claims, 4 Drawing Sheets

(51) Int. Cl.
*H01M 50/116* (2021.01)
*H01M 50/543* (2021.01)
*H01M 10/058* (2010.01)

(56) References Cited

FOREIGN PATENT DOCUMENTS

| | | | |
|---|---|---|---|
| JP | 2016-225301 A | 12/2016 |
| KR | 10-2017-0093598 A | 8/2017 |
| WO | 2016/047389 A1 | 3/2016 |

NON-AQUEOUS ELECTROLYTE SECONDARY BATTERY

TECHNICAL FIELD

The present invention relates to a non-aqueous electrolyte secondary battery.

Priority is claimed on Japanese Patent Application No. 2018-056887, filed on Mar. 23, 2018, the content of which is incorporated herein by reference.

BACKGROUND ART

In order to reduce the weight of a battery and to increase the degree of freedom in battery design, a laminated cell has been put into practical use in which a battery element in which an electrode is laminated or wound is hermetically sealed using a laminated film which is obtained by laminating a metal layer and a resin layer as an exterior body.

The laminated film has a metal layer and a resin layer covering both surfaces of the metal layer. In a case where a crack or the like occurs in part of the resin layer of the laminated film, the metal layer of the laminated film may react with the electrolyte. For example, a precipitation reaction in which conductive ions are precipitated as a metal, an alloying reaction in which conductive ions and a constituent metal of the metal layer are alloyed, or the like occur. In a case where these reactions occur, the metal layer of the exterior body corrodes, and the gas barrier property of the laminated film is reduced. The reduction in the gas barrier property of the laminated film reduces the long-term reliability of a non-aqueous electrolyte secondary battery. Therefore, a method capable of suppressing corrosion of the metal layer of the exterior body is required.

Patent Document 1 describes an exterior body for an electrochemical device wherein a sheet-like laminate in which at least a base layer, a metal layer, and a sealant layer are laminated in order is molded, and thicknesses of curved portions a and c which form corner portions of the formed metal layer and a thickness of a portion b located between the curved portions satisfy a specific relationship (a≥b>c or a≥c>b).

Patent Document 2 describes a non-aqueous electrolyte secondary battery in which a metal layer of a laminated film is electrically connected to a positive electrode.

CITATION LIST

Patent Literature

[Patent Document 1]
PCT International Publication No. WO 2016/047389
[Patent Document 2]
Japanese Unexamined Patent Application, First Publication No. 2000-353502

SUMMARY OF INVENTION

Technical Problem

In the exterior body described in Patent Document 1, the occurrence of a crack is suppressed by controlling the shape of the curved portion. However, the corrosion reaction of the metal cannot be prevented in a case where a crack occurs.

Moreover, in the non-aqueous electrolyte secondary battery described in Patent Document 2, the reduction in the potential of the metal layer is prevented by electrically connecting the metal layer of the laminated film to the positive electrode. However, in a case where the positive electrode is electrically connected to the metal layer, an overvoltage may be applied to the positive electrode due to a short circuit of the metal layer with an external power source or the like.

The present invention has been contrived in view of the above problems, and an object of the present invention is to provide a non-aqueous electrolyte secondary battery in which a potential of a metal layer in an exterior body is kept noble, and corrosion can be suppressed.

Solution to Problem

The inventors have conducted intensive studies, and as a result, found that by controlling the thickness of the exterior body, the potential of the metal layer can be kept noble without electrical short circuit between the positive electrode and the metal layer of the laminated film.

That is, the present invention provides the following means in order to solve the problem.

(1) A non-aqueous electrolyte secondary battery according to a first aspect, including: a power generation element wherein a positive electrode and a negative electrode are opposed to each other with a separator interposed therebetween, and the negative electrode is disposed on an outer side than the positive electrode; and an exterior body which covers the power generation element, and has a metal layer and a resin layer which covers both surfaces of the metal layer, in which an average thickness $t_1$ of a first part of the exterior body which covers upper and lower surfaces of the power generation element in a lamination direction of the power generation element and an average thickness $t_2$ of a second part of the exterior body which covers side surfaces of the power generation element satisfy a relationship of $t_2/t_1 < 0.995$.

(2) In the non-aqueous electrolyte secondary battery according to the above aspect, the average thickness $t_1$ of the first part and the average thickness $t_2$ of the second part may satisfy a relationship of $0.750 \leq t_2/t_1 < 0.995$.

(3) In the non-aqueous electrolyte secondary battery according to the above aspect, the average thickness $t_1$ of the first part and the average thickness $t_2$ of the second part may satisfy a relationship of $t_2/t_1 \leq 0.980$.

(4) In the non-aqueous electrolyte secondary battery according to the above aspect, a negative electrode terminal which includes a first end portion which is connected to the negative electrode, and a second end portion which extends from the exterior body may be further included, and at least part of the negative electrode terminal may be covered with an insulating tape.

Advantageous Effects of Invention

According to the non-aqueous electrolyte secondary battery of the above aspect, the potential of the metal layer in the exterior body can be kept noble, and corrosion can be suppressed.

DESCRIPTION OF EMBODIMENTS

Figure 1:
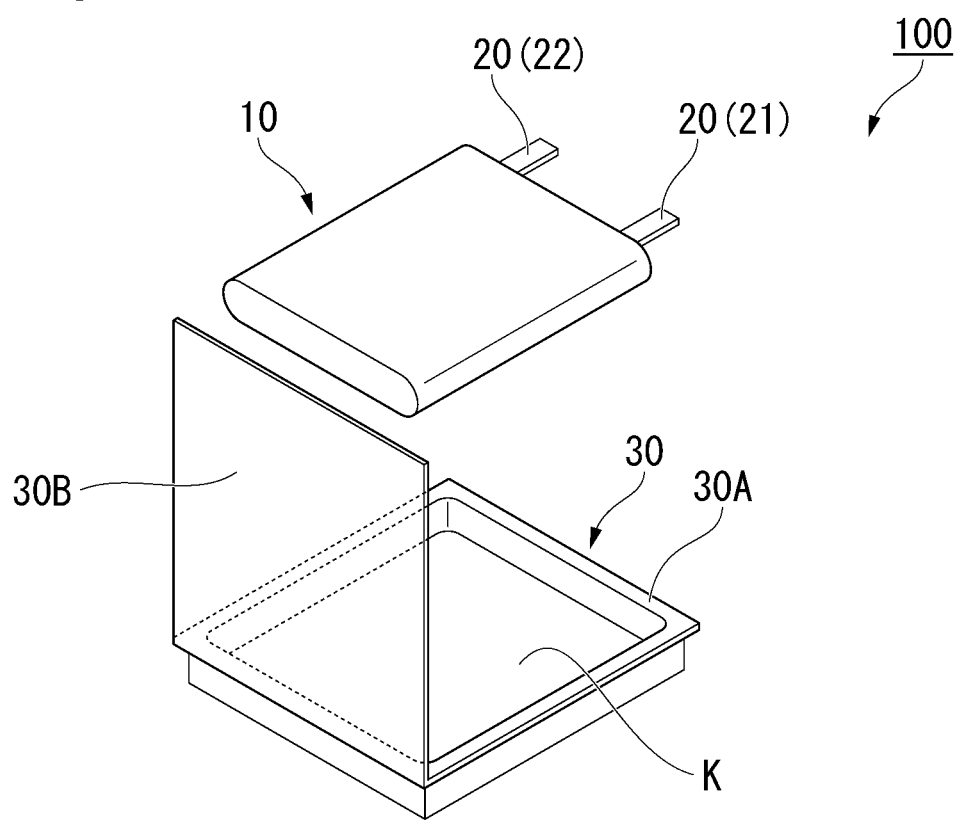
FIG. 1 is a schematic perspective view of a non-aqueous electrolyte secondary battery according to the present embodiment.

Hereinafter, the embodiments will be described in detail with appropriate reference to the drawings. In the drawings used in the following description, characteristic parts may be shown in an enlarged manner for the sake of convenience in order to make the characteristics of the present invention easier to understand, and dimensions and ratios of the respective constituent elements may be different from actual ratios. The materials, dimensions, and the like exemplified in the following description are merely an example. The present invention is not limited thereto and can be appropriately modified and implemented within the scope not deviating from the gist of the present invention.

[Non-Aqueous Electrolyte Secondary Battery]

FIG. 1 is a schematic diagram of a non-aqueous electrolyte secondary battery according to the present embodiment. A non-aqueous electrolyte secondary battery 100 shown in FIG. 1 includes a power generation element 10, two terminals 20 (a negative electrode terminal 21 and a positive electrode terminal 22), and an exterior body 30. The power generation element 10 is accommodated in an accommodation space K provided in the exterior body 30. FIG. 1 shows a state immediately before the power generation element 10 is accommodated in the exterior body 30 for the sake of easy understanding.

(Power Generation Element)

Figure 2:
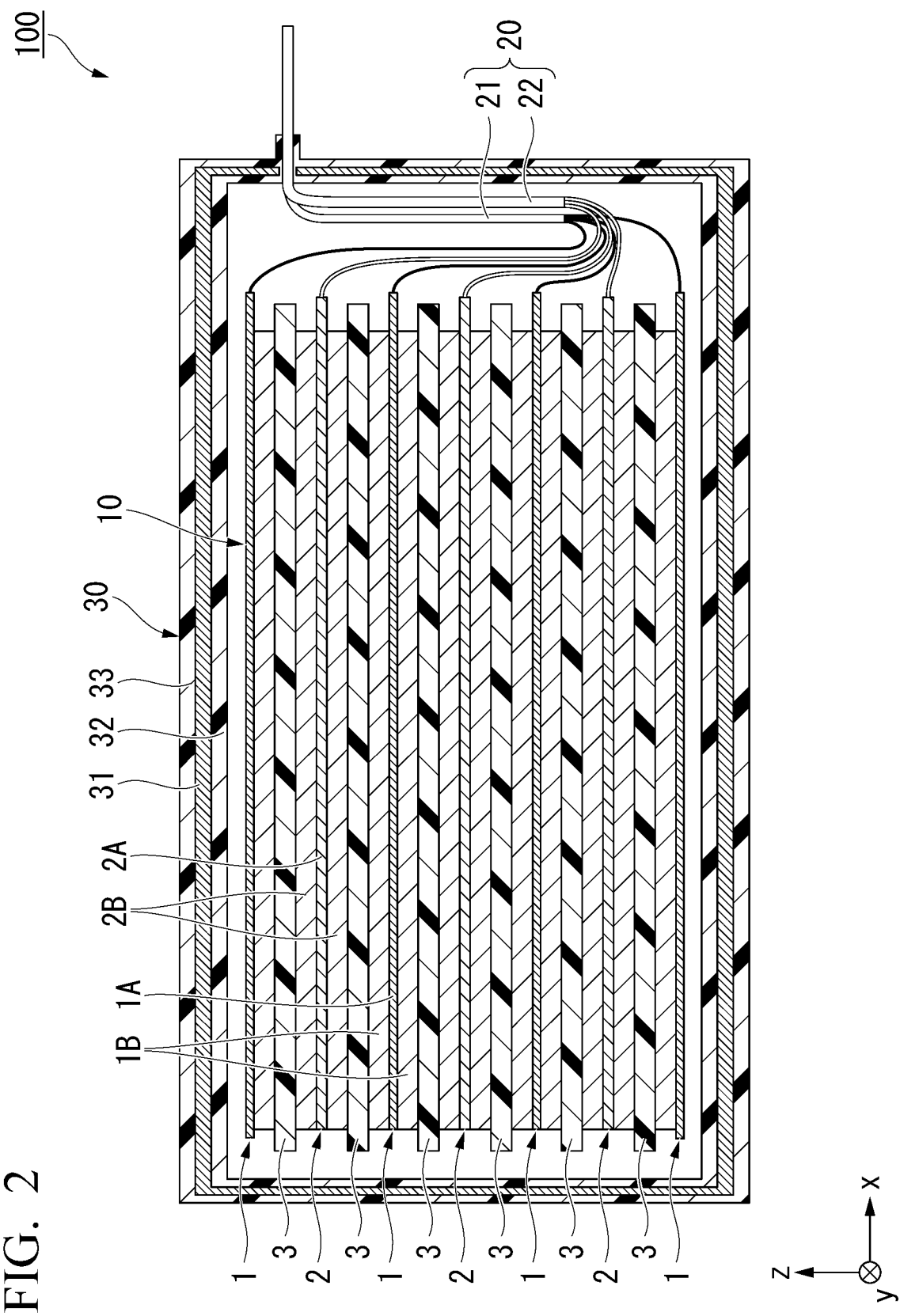
FIG. 2 is a schematic cross-sectional view of the non-aqueous electrolyte secondary battery according to the present embodiment.

FIG. 2 is a schematic cross-sectional view of the non-aqueous electrolyte secondary battery according to the present embodiment. The power generation element 10 in FIG. 2 includes a negative electrode 1, a positive electrode 2, and a separator 3. The power generation element 10 shown in FIG. 2 is a laminate in which the negative electrode 1 and the positive electrode 2 are disposed to be opposed to each other with the separator 3 interposed therebetween. The number of negative electrodes 1, positive electrodes 2, and separators 3 in the laminate is not particularly limited. The power generation element 10 may be a wound body obtained by winding a laminate in which the negative electrode 1 and the positive electrode 2 are opposed to each other with the separator 3 interposed therebetween. The negative electrode 1 is disposed on the outer side than the positive electrode. The separator 3 is preferably disposed on the outer side than the negative electrode 1 from the viewpoint of keeping the potential of the metal layer of the exterior body noble.

The negative electrode 1 has a negative electrode current collector 1A and a negative electrode active material layer 1B having a plate-like (film-like) shape. The negative electrode active material layer 1B is formed on at least one surface of the negative electrode current collector 1A. The positive electrode 2 has a positive electrode current collector 2A and a positive electrode active material layer 2B having a plate-like (film-like) shape. The positive electrode active material layer 2B is formed on at least one surface of the positive electrode current collector 2A. The negative electrode active material layer 1B and the positive electrode active material layer 2B are impregnated with an electrolytic liquid. The negative electrode 1 and the positive electrode 2 exchange ions through the electrolytic liquid.

The positive electrode current collector 2A may be a conductive plate material, and for example, a thin metal plate of aluminum, stainless steel, copper, or nickel foil can be used.

As the positive electrode active material used for the positive electrode active material layer 2B, an electrode active material capable of reversibly proceeding ion occlusion and emission, ion desorption and insertion (intercalation), or doping and dedoping of ions and counter anions can be used. As the ions, for example, lithium ions, sodium ions, magnesium ions, and the like can be used, and lithium ions are particularly preferably used.

For example, in a lithium ion secondary battery, a complex metal oxide such as lithium cobaltate ($LiCoO_2$), lithium nickelate ($LiNiO_2$), lithium manganate ($LiMnO_2$), lithium manganese spinel ($LiMn_2O_4$), a complex metal oxide represented by General Formula: $LiNi_xCo_yMn_zM_aO_2$ (x+y+z+a=1, 0≤x<1, 0≤y<1, 0≤z<1, 0≤a<1, and M represents one or more elements selected from Al, Mg, Nb, Ti, Cu, Zn, and Cr), a lithium vanadium compound ($LiV_2O_5$), olivine-type $LiMPO_4$ (where M represents one or more elements selected from Co, Ni, Mn, Fe, Mg, Nb, Ti, Al, and Zr or VO), lithium titanate ($Li_4Ti_5O_{12}$), and $LiNi_xCo_yAl_zO_2$ (0.9<x+y+z<1.1), polyacetylene, polyaniline, polypyrrole, polythiophene, polyacene, and the like can be used as the positive electrode active material.

The positive electrode active material layer 2B may have a conductive material. Examples of the conductive material include carbon powders such as carbon blacks, carbon nanotubes, carbon materials, fine metal powders such as copper, nickel, stainless steel, and iron, mixtures of carbon materials and fine metal powders, and conductive oxides such as ITO. In a case where a sufficient conductive property can be secured only with the positive electrode active material, the positive electrode active material layer 2B may not contain a conductive material.

The positive electrode active material layer 2B contains a binder. A known material can be used as the binder. Examples thereof include fluorine resins such as polyvinylidene fluoride (PVDF), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoro ethylene copolymer (ETFE), polychlorotrifluoroethylene (PCTFE), ethylene-chlorotrifluoroethylene copolymer (ECTFE), and polyvinyl fluoride (PVF).

Other than the above materials, vinylidene fluoride-based fluororubbers such as vinylidene fluoride-hexafluoropropylene-based fluororubbers (VDF-HFP-based fluororubbers), vinylidene fluoride-hexafluoropropylene-tetrafluoroethylene-based fluororubbers (VDF-HFP-TFE-based fluororubbers), vinylidene fluoride-pentafluoropropylene-based fluororubbers (VDF-PFP-based fluororubbers), vinylidene fluoride-pentafluoropropylene-tetrafluoroethylene-based fluororubbers (VDF-PFP-TFE-based fluororubbers), vinylidene fluoride-perfluoromethyl vinyl ether-tetrafluoroethylene-based fluororubbers (VDF-PFMVE-TFE-based fluororubbers), and vinylidene fluoride-chlorotrifluoroethylene-based fluororubbers (VDF-CTFE-based fluororubbers) may be used as the binder.

As the negative electrode active material used for the negative electrode active material layer 1B, a negative electrode active material used for a known non-aqueous electrolyte secondary battery can be used. Examples of the negative electrode active material include particles containing an alkali or alkaline earth metal such as metallic lithium, graphite capable of occluding/emitting ions (natural graphite, artificial graphite), a carbon material such as carbon nanotube, hardly graphitizable carbon, easily graphitizable carbon, or low-temperature baked carbon, a metal such as aluminum, silicon, or tin that can be combined with a metal such as lithium, an amorphous compound mainly composed of an oxide such as $SiO_x$ (0<x<2) or tin dioxide, or lithium titanate ($Li_4Ti_5O_{12}$).

The negative electrode current collector 1A, the conductive material, and the binder may be the same as those in the positive electrode 2. For the binder used for the negative electrode, for example, cellulose, a styrene/butadiene rubber, an ethylene/propylene rubber, a polyimide resin, a polyamideimide resin, an acrylic resin, or the like may be used other than those exemplified for the positive electrode.

The separator 3 may be formed of a porous structure having an electrical insulation property, and examples thereof include a single layered body of a film formed of polyolefin such as polyethylene or polypropylene or a laminate thereof, a stretched film of a mixture of the above resins, and a fiber nonwoven fabric formed of at least one constituent material selected from the group consisting of cellulose, polyester, polyacrylonitrile, polyamide, polyethylene, and polypropylene.

In the separator 3, a functional layer such as a heat-resistant layer containing inorganic particles or a heat-resistant resin or an adhesion layer containing an adhesive resin may be laminated on one or both surfaces thereof.

As the electrolytic liquid, an electrolyte solution containing a salt or the like (electrolyte aqueous solution, non-aqueous electrolytic liquid) can be used. The electrolyte aqueous solution has an electrochemically low decomposition voltage, and the withstand voltage during charging is reduced. Accordingly, a non-aqueous electrolytic liquid is preferably used. In the non-aqueous electrolytic liquid, a non-aqueous solvent such as an organic solvent is used as a solvent.

The non-aqueous electrolytic liquid contains a salt (electrolyte) and a non-aqueous solvent. The non-aqueous solvent may contain a cyclic carbonate and a chain carbonate. The ratio between the cyclic carbonate and the chain carbonate in the non-aqueous solvent is preferably 1:9 to 1:1 by volume. Part or all of the non-aqueous solvent may be replaced with an ionic liquid from the viewpoint of safety.

A cyclic carbonate that can solvate the electrolyte is used. For example, ethylene carbonate, propylene carbonate, butylene carbonate, or the like is used as the cyclic carbonate.

The chain carbonate reduces the viscosity of the cyclic carbonate. For example, diethyl carbonate, dimethyl carbonate, ethyl methyl carbonate, or the like is used as the chain carbonate. In addition, chain esters such as methyl acetate, ethyl acetate, methyl propionate, and ethyl propionate, cyclic esters such as γ-butyrolactone, nitriles such as acetonitrile, propionitrile, glutaronitrile, and adiponitrile, 1,2-dimethoxyethane, 1,2-diethoxyethane, and the like may be mixed and used.

An additive may be appropriately added to the electrolytic liquid. As the additive, vinylene carbonate, vinyl ethylene carbonate, fluoroethylene carbonate, propane sultone, butane sultone, adiponitrile, succinonitrile, glutaronitrile, diphenyl carbonate, cyclohexyl benzene, tert-butyl benzene, lithium bisoxalate borate, lithium bis(trifluoromethanesulfonyl)imide, and the like can be used. One additive may be used, or two or more additives may be used as a mixture.

A metal salt can be used as the electrolyte. For example, a lithium salt such as $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, or LiBOB can be used. These lithium salts may be used alone or in combination of two or more thereof. Particularly, $LiPF_6$ is preferably contained as an electrolyte from the viewpoint of the ionization degree.

In a case where $LiPF_6$ is dissolved in a non-aqueous solvent, the concentration of the electrolyte in the non-aqueous electrolytic liquid is preferably adjusted to 0.5 to 2.0 mol/L. In a case where the concentration of the electrolyte is 0.5 mol/L or greater, the lithium ion concentration of the non-aqueous electrolytic liquid can be sufficiently secured, and a sufficient capacity is easily obtained during charging and discharging. In addition, in a case where the concentration of the electrolyte is suppressed to 2.0 mol/L or less, an increase in the viscosity of the non-aqueous electrolytic liquid is suppressed, the mobility of lithium ions can be sufficiently secured, and a sufficient capacity is easily obtained during charging and discharging.

In a case where $LiPF_6$ is mixed with other electrolytes, the lithium ion concentration in the non-aqueous electrolytic liquid is also preferably adjusted to 0.5 to 2.0 mol/L, and more preferably, the lithium ion concentration from $LiPF_6$ is 50 mol % or greater thereof.

The non-aqueous electrolytic liquid may be a gel-like electrolyte held in a polymer material. Examples of the polymer material include polyvinylidene fluoride and a copolymer of polyvinylidene fluoride, and examples of the copolymer monomer thereof include hexafluoropropylene and tetrafluoroethylene. The polyvinylidene fluoride and the copolymer thereof are preferable since high battery characteristics can be obtained.

In addition, for example, polyacrylonitrile and a copolymer of polyacrylonitrile can be used as the polymer material. Examples of the copolymer monomer thereof include vinyl-based monomers such as vinyl acetate, methyl methacrylate, butyl methacrylate, methyl acrylate, butyl acrylate, itaconic acid, hydrogenated methyl acrylate, hydrogenated ethyl acrylate, acrylamide, vinyl chloride, vinylidene fluoride, and vinylidene chloride. In addition, an acrylonitrile butadiene rubber, an acrylonitrile butadiene styrene resin, an acrylonitrile polyethylene chloride propylene diene styrene resin, an acrylonitrile polyethylene chloride propylene diene styrene resin, an acrylonitrile vinyl chloride resin, an acrylonitrile methacrylate resin, an acrylonitrile acrylate resin, or the like may be used.

As the polymer material, for example, a polyethylene oxide and a copolymer of polyethylene oxide may be used, and examples of the copolymerization monomer thereof include a polypropylene oxide, methyl methacrylate, butyl methacrylate, methyl acrylate, and butyl acrylate. In addition, polyether-modified siloxane and a copolymer thereof may be used.

(Terminal)

Two terminals 20 are provided. One terminal is the negative electrode terminal 21 and the other terminal is the positive electrode terminal 22. One end (first end portion) of the terminal 20 is connected to the power generation element 10, and the other end (second end portion) extends to the outside of the exterior body 30. The two terminals 20 may extend in the same direction or in different directions. The negative electrode terminal 21 is connected to the negative electrode current collector 1A, and the positive electrode terminal 22 is connected to the positive electrode current collector 2A. The connection method is not particularly limited, and welding, screwing, or the like can be used. A conductive material such as aluminum or nickel can be used for the terminal 20.

A sealant formed of a resin may be installed at sealing parts of the negative electrode terminal 21 and the positive electrode terminal 22 with the exterior body 30. The sealant prevents a short circuit between the negative and positive electrode terminals 21 and 22 and a metal layer 31 of the exterior body 30 during heat sealing. The resin preferably contains polyethylene (PE) or polypropylene (PP) in consideration of a sealing property with the exterior body.

(Exterior Body)

The exterior body 30 seals the power generation element 10 and the electrolytic liquid therein. The exterior body 30 has a metal layer 31, an inner surface resin layer 32 that covers an inner surface of the metal layer 31 on the side of the power generation element 10, and an outer surface resin layer 33 that covers an outer surface of the metal layer 31 on the side opposite to the power generation element 10. The exterior body 30 is a so-called metal laminate film.

A polymer film such as polypropylene can be used as the inner surface resin layer 32 and the outer surface resin layer 33. The material of the inner surface resin layer 32 and the material of the outer surface resin layer 33 may be different. For example, a polymer having a high melting point, for example, polyethylene terephthalate (PET), polyamide (PA), or the like is used as the material of the outer surface resin layer 33, and polyethylene (PE), polypropylene (PP), or the like can be used as the material of the polymer film of the inner surface resin layer 32.

In the exterior body 30 shown in FIG. 1, an accommodation space K is formed by folding a first surface 30A having a recessed portion and a second surface 30B. The first surface 30A and the second surface 30B are brought into close contact with each other by sealing the outer peripheries thereof. The exterior body 30 is not limited to the body in which the accommodation space K is formed by folding the first surface 30A and the second surface 30B as shown in FIG. 1, and may be a body in which two films are bonded. The recessed portion may be provided in each of two films, or in only one film.

"Relationship Between Exterior Body and Power Generation Element"

Figure 3:
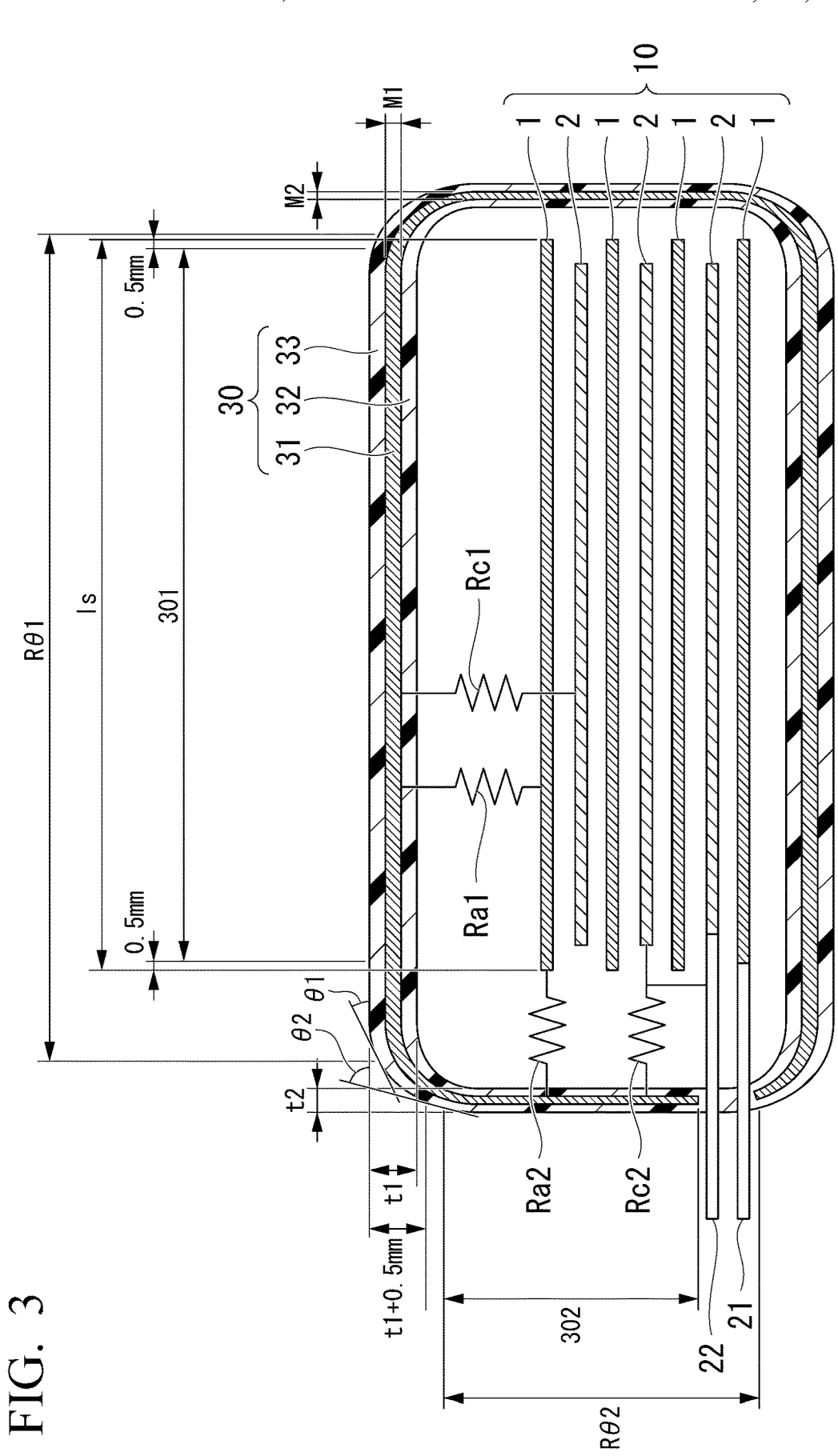
FIG. 3 is a schematic diagram for explaining a relationship in potential between an exterior body and a power generation element in the non-aqueous electrolyte secondary battery according to the present embodiment.

FIG. 3 is a schematic diagram for explaining a relationship in potential between the exterior body and the power generation element in the non-aqueous electrolyte secondary battery according to the present embodiment. In FIG. 3, the separator 3 between the negative electrode 1 and the positive electrode 2 is omitted for the sake of simplicity, and the negative electrode 1 and the positive electrode 2 are shown with an interval therebetween.

An average thickness t1 of a first part 301 of the exterior body 30 that covers the upper and lower surfaces of the power generation element 10 in a lamination direction and an average thickness t2 of a second part 302 of the exterior body 30 that covers the side surfaces of the power generation element 10 satisfy a relationship of t2/t1<0.995.

Regarding the "lamination direction of the power generation element 10", in a case where the power generation element 10 is a laminate, the above lamination direction is a lamination direction of the laminate. In a case where the power generation element 10 is a flat wound body, the above lamination direction is a direction in which the distance from the center of winding to the outer surface is the shortest. In a case where the power generation element 10 is a wound body wound concentrically with the center of winding as a reference, the above lamination direction is any direction from the center of winding as a reference. This is because in a case of the wound body, the negative electrode 1, the positive electrode 2, and the separator 3 are laminated with the center of winding as a reference.

Regarding the "upper and lower surfaces", in a case where the power generation element 10 is a laminate, the above upper and lower surfaces mean outermost surfaces on both sides of the laminate in the lamination direction. In a case where the power generation element 10 is a flat wound body, the above upper and lower surfaces mean flat surfaces located on both sides. In a case where the power generation element 10 is a wound body wound concentrically with the winding center as a reference, the upper surface is one arc surface when the wound body is cut at a plane orthogonal to the lamination direction and passing through the central axis, and the lower surface is the other arc surface.

Regarding the "side surface", in a case where the power generation element 10 is a laminate, the above side surface is a surface located in the in-plane direction of the laminate. In a case where the power generation element 10 is a wound body, the above side surface is a surface located in the central axis direction of the wound body.

The "first part 301" in the upper surface 30a and the lower surface 30b means a region where a region Rθ1 inside a position at which the angle formed between the tangent of the position and the upper surface 30a or the lower surface 30b is 15° and a region 0.5 mm or greater inside an end of the projection surface is of the negative electrode 1 overlap. The "second part 302" in the side surfaces excluding the sealing portion means a region where a region Rθ2 inside a position at which the angle formed between the tangent of the position and the upper surface 30a or the lower surface 30b is 75° or more and a region the average thickness t1 of the first part 301+0.5 mm inside from the planes provided by the upper surface 30a and the lower surface 30b overlap. That is, the sealing portion and the curved portion covering the corner portion of the power generation element 10 in which the distances from the upper and lower surfaces and from the side surfaces are short have little contribution to the potential of the metal layer 31 of the exterior body 30 and are thus not included in the parts.

In a case where the average thickness t1 of the first part and the average thickness t2 of the second part of the exterior body 30 satisfy the above relationship, the potential of the metal layer 31 of the exterior body 30 can be kept noble.

A potential V31 of the metal layer 31 of the exterior body 30 is expressed by the following formula (1).

$$V31 = Va + (Vc - Va) \times 1/(1 + Rc/Ra) \tag{1}$$

Here, in Formula (1), Va represents a potential of the negative electrode 1, Vc represents a potential of the positive electrode 2, Ra represents a resistance between the metal layer 31 of the exterior body 30 and the negative electrode 1, and Rc represents a resistance between the metal layer 31 of the exterior body 30 and the positive electrode 2. Formula (1) is obtained by the product of a cell voltage (Vc−Va) and a ratio of the resistance Rc between the metal layer 31 and the positive electrode 2 to the resistance Ra between the metal layer 31 and the negative electrode 1 on the basis of the potential Va of the negative electrode 1. In Formula (1), the smaller Rc/Ra, the higher (nobler) the potential V31 of the metal layer 31 of the exterior body 30.

Here, the resistance Ra between the metal layer 31 of the exterior body 30 and the negative electrode 1 is divided into a resistance Ra1 between the metal layer 31 and the negative electrode 1 in the first part 301 and a resistance Ra2 between the metal layer 31 and the negative electrode 1 in the second part 302. In addition, the resistance Rc between the metal layer 31 of the exterior body 30 and the positive electrode 2 is divided into a resistance Rc1 between the metal layer 31 and the positive electrode 2 in the first part 301 and a resistance Rc2 between the metal layer 31 and the positive electrode 2 in the second part 302.

The negative electrode 1 exists between the metal layer 31 and the positive electrode 2 in the first part 301. Accordingly, the resistance Rc1 between the metal layer 31 and the positive electrode 2 in the first part 301 is larger than the resistance Ra1 between the metal layer 31 and the negative electrode 1 in the first part 301. In other words, it is difficult to reduce Rc/Ra in the first part 301.

In a case where the resistance between the power generation element 10 and the metal layer 31 in the first part 301 is smaller than the resistance between the power generation element 10 and the metal layer 31 in the second part 302 (in a case where a short circuit is more easily caused between the power generation element 10 and the metal layer 31 in the first part 301 than in the second part 302), the potential V31 of the metal layer 31 is strongly influenced by the resistance between the power generation element 10 and the metal layer 31 in the first part 301. As described above, since it is difficult to reduce Rc/Ra in the first part 301, it is difficult to keep the potential V31 of the metal layer 31 noble in this case.

In the second part 302, the relationship between the negative electrode 1 and the metal layer 31 is equal to the relationship between the positive electrode 2 and the metal layer 31. Accordingly, Rc/Ra is more easily reduced in the second part 302 than in the first part 301. In a case where the resistance between the power generation element 10 and the metal layer 31 in the second part 302 is made smaller than the resistance between the power generation element 10 and the metal layer 31 in the first part 301, the influence of the resistance between the power generation element 10 and the metal layer 31 in the second part 302 on the potential V31 of the metal layer 31 is increased.

In a case where the average thickness t2 of the second part 302 of the exterior body 30 is smaller than the average thickness t1 of the first part 301, the resistance between the power generation element 10 and the metal layer 31 in the second part 302 is smaller than the resistance between the power generation element 10 and the metal layer 31 in the first part 301. Accordingly, Rc/Ra is more easily reduced in the second part 302 than in the first part 301. That is, in a case where the average thickness t2 of the second part 302 of the exterior body 30 is made smaller than the average thickness t1 of the first part 301, Rc/Ra can be reduced, and the potential of the metal layer 31 of the exterior body 30 can be kept noble.

The average thickness t1 of the first part 301 and the average thickness t2 of the second part 302 preferably satisfy a relationship of $0.50 \text{ V} \leq t2/t1 < 0.995$, more preferably a relationship of $0.750 \leq t2/t1 < 0.995$, and even more preferably a relationship of $t2/t1 \leq 0.980$. In a case where t2/t1 satisfies the above relationship, a short circuit between the power generation element 10 and the metal layer 31 can be prevented, and Rc/Ra can be further reduced.

Each of the average thickness t1 of the first part 301 and the average thickness t2 of the second part 302 is obtained as an average value of thicknesses at arbitrary five points in each region.

In a case where a ratio of the thickness of the metal layer 31 to the thickness of the exterior body 30 in the first part 301 is equal to a ratio of the thickness of the metal layer 31 to the thickness of the exterior body 30 in the second part 302, substitution with a thickness M1 of the metal layer 31 in the first part 301 and a thickness M2 of the metal layer 31 in the second part 302 is possible. That is, it can be said that the average thickness t1 of the first part 301 and the average thickness t2 of the second part 302 satisfies a relationship of t2/t1 in a case where the thickness M1 of the metal layer 31 in the first part 301 and the thickness M2 of the metal layer 31 in the second part 302 satisfy a relationship of M2/M1. The case where the ratio of the thickness of the metal layer 31 to the thickness of the exterior body 30 in the first part 301 is equal to the ratio of the thickness of the metal layer 31 to the thickness of the exterior body 30 to in the second part 302 corresponds to a case where a recessed portion is formed in one film to produce the exterior body 30.

At least part of the negative electrode terminal 21 is preferably covered with an insulating tape. In a case where part of the negative electrode terminal 21 is covered with an insulating tape, the resistance Ra between the metal layer 31 of the exterior body 30 and the negative electrode 1 is increased. That is, Rc/Ra in Formula (1) is reduced, and the potential V31 of the metal layer 31 of the exterior body 30 is increased (becomes nobler).

As described above, according to the non-aqueous electrolyte secondary battery of the present embodiment, the potential V31 of the metal layer 31 of the exterior body 30 can be increased. Accordingly, the corrosion reaction of the metal layer 31 can be suppressed.

[Method of Manufacturing Non-Aqueous Electrolyte Secondary Battery]

The non-aqueous electrolyte secondary battery 100 can be produced by a known method, except that the thickness of the exterior body 30 is controlled. Hereinafter, an example of the method of manufacturing the non-aqueous electrolyte secondary battery 100 will be described in detail.

First, the negative electrode 1 and the positive electrode 2 are produced. The negative electrode 1 and the positive electrode 2 are different from each other only in a substance to be an active material and can be produced by the same manufacturing method.

A positive electrode active material, a binder, and a solvent are mixed to prepare a coating material. A conductive material may be further added as necessary. For example, water, N-methyl-2-pyrrolidone, N,N-dimethylformamide, or the like can be used as the solvent. The constituent ratio of the positive electrode active material, the conductive material, and the binder is preferably 80 wt % to 90 wt %:0.1 wt % to 10 wt %:0.1 wt % to 10 wt % by mass ratio. These mass ratios are adjusted such that the sum is 100 wt %.

The mixing method of these components of the coating material is not particularly limited, and the mixing order is also not particularly limited. The coating material is applied to the positive electrode current collector 2A. The coating method is not particularly limited, and a method that is normally employed to produce an electrode can be used. Examples thereof include a slit die coating method and a doctor blade method. Similarly, for the negative electrode, a coating material is applied to the negative electrode current collector 1A.

Next, the solvent in the coating material applied to the negative electrode current collector 1A and the positive electrode current collector 2A is removed. The removing method is not particularly limited. For example, the negative electrode current collector 1A and the positive electrode current collector 2A to which the coating material is applied are dried in an atmosphere of 80° C. to 150° C. Then, the negative electrode 1 and the positive electrode 2 are completed.

In a case where the power generation element 10 is a laminate, the negative electrode 1, the positive electrode 2, and the separator 3 are laminated. In a case where the power generation element 10 is a wound body, the negative electrode 1, the positive electrode 2, and the separator 3 are wound with one end side thereof as an axis. In any case, the separator 3 is disposed between the negative electrode 1 and the positive electrode 2.

Figure 4:
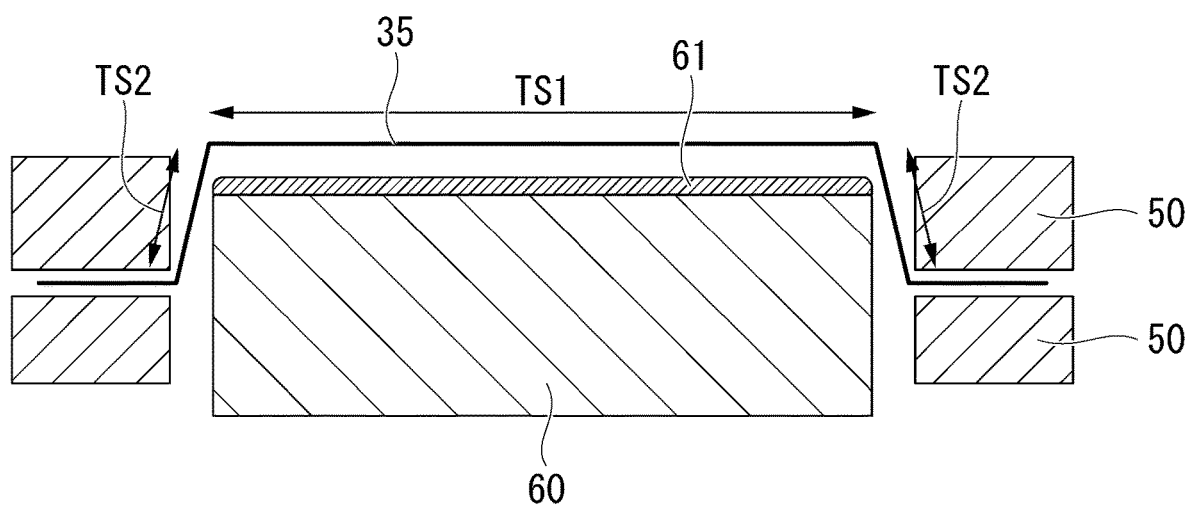
FIG. 4 is a diagram schematically showing an example of a method of manufacturing the exterior body of the non-aqueous electrolyte secondary battery according to the present embodiment.

Next, the exterior body 30 is prepared. FIG. 4 is a diagram schematically showing an example of a method of manufacturing the exterior body of the non-aqueous electrolyte secondary battery according to the present embodiment. First, a uniform exterior film 35 in which a metal layer is interposed between resin layers is prepared. A commercially available product can be used as the exterior film 35.

Next, a predetermined position in the exterior film 35 is pressed by a pressing jig 50. A mold 60 whose surface is covered with a rubber 61 is pressed against the exterior film 35 to form a recessed portion in the exterior film 35. Another material may be used instead of the rubber in a case where the material has a high friction coefficient.

In a case where the surface of the mold 60 is covered with the rubber 61, the degree of elongation of the exterior film 35 varies in the mold pressing surface and in the non-pressing surface of the exterior film 35.

In a case where the mold 60 not covered with the rubber 61 is used, the exterior film 35 slides on the surface of the mold 60. Accordingly, a tension TS1 that is applied to the first part of the exterior film 35 against which the mold 60 is pressed is equal to a tension TS2 that is applied to the second part of the exterior film 35 against which the mold 60 is not pressed. In a case where the tension TS1 that is applied to the first part and the tension TS2 that is applied to the second part are equal, the thickness of the first part and the thickness of the second part of the exterior film 35 are substantially equal. The change in the shape of the exterior film 35 is compensated by reducing the thickness of the exterior film 35 at a part in contact with an edge part of the mold 60 to which a large stress is applied.

In a case where the mold 60 covered with the rubber 61 is used, the exterior film 35 is fixed by the rubber 61 and does not easily slip. Accordingly, the tension TS1 that is applied to the first part of the exterior film 35 against which the mold 60 is pressed is smaller than the tension TS2 that is applied to the second part of the exterior film 35 against which the mold 60 is not pressed by the frictional force acting on the part in contact with the edge part of the mold 60. As a result, the thickness of the first part of the exterior film 35 is relatively larger than the thickness of the second part.

The exterior body 30 in which the thickness of each part is controlled is produced through the above procedures. Then, the power generation element is fitted into the produced recessed portion, and the power generation element 10 is sealed in the exterior body 30.

A non-aqueous electrolytic liquid may be injected into the exterior body 30, or the power generation element 10 may be impregnated with the non-aqueous electrolytic liquid. Then, the exterior body 30 is sealed by applying heat or the like, and a non-aqueous electrolyte secondary battery 100 is produced.

Although the embodiments have been described in detail with reference to the drawings, the configuration in each embodiment and combinations thereof are merely an example, and additions, omissions, substitutions, and other modifications in the configuration can be made without departing from the spirit of the present invention.

EXAMPLES

Example 1

First, a positive electrode active material layer was applied to both surfaces of a positive electrode current collector formed of aluminum foil to produce a positive electrode. The positive electrode active material layer has 94 parts by mass of $LiCoO_2$ (active material), 2 parts by mass of carbon (conductive material), and 4 parts by mass of polyvinylidene fluoride (PVDF, binder).

Similarly, a negative electrode active material layer was applied to both surfaces of a negative electrode current collector formed of copper foil to produce a negative electrode. The negative electrode active material layer has 95 parts by mass of graphite (active material), 1 part by mass of carbon (conductive material), 1.5 parts by mass of styrene butadiene rubber (SBR, binder), and 2.5 parts by mass of carboxymethyl cellulose (CMC, binder).

A separator was produced by applying a heat-resistant layer to one surface of a microporous polyethylene film. The heat-resistant layer has 97 parts by mass of alumina (heat-resistant filler) and 3 parts by mass of polyvinylidene fluoride (PVDF, binder). Then, the positive electrode, the negative electrode, and the separator were laminated to produce a laminate. The number of negative electrodes in the laminate was 14, and the number of positive electrodes was 13. The outermost layer of the laminate was a negative electrode.

Next, an aluminum laminate film was prepared as an exterior body. The aluminum laminate film had a three-layer structure of an inner resin layer formed of polypropylene (PP), a metal layer formed of aluminum, and an outer resin layer formed of nylon. The total thickness of the aluminum laminate film was 110 µm.

Next, a mold whose surface was covered with a rubber was pressed against the aluminum laminate film to form a recessed portion. The molding of the recessed portion was performed stepwise at a low speed for each depth of 0.1 mm. The recessed portion after molding had a depth of 4.0 mm.

The laminate was housed in the exterior body, and a non-aqueous electrolytic liquid was injected to produce a non-aqueous electrolyte secondary battery. As the non-aqueous electrolytic liquid, a material obtained by adding 1.0 M (mol/L) of $LiPF_6$ as a lithium salt to a solvent containing ethylene carbonate (EC), propylene carbonate (PC), and diethyl carbonate (DEC) with a volume ratio of 35:35:30 was used.

Two cells were produced under the same conditions. One cell was used for measuring a potential difference (IV) between the positive electrode and the metal layer of the exterior body, and the other cell was used for measuring a ratio t2/t1 of an average thickness t2 of a second part to an average thickness t1 of a first part of the exterior body after taking out the exterior body. t2/t1 was measured, and a relationship of t2/t1=0.7 was satisfied.

The power generation element (laminate) and the metal layer of the exterior body were connected to an oscilloscope having an input resistance of 1 MΩ via a probe with a damping ratio of 10:1, and a potential of the metal layer was measured. The potential of the metal layer reaches a peak immediately after the probe connection, and then exponentially decreases. An initial peak potential IV0 of the metal layer at that time was measured. In addition, measurement of a potential IV1 of the metal layer after 1 second was performed immediately after the production of the cell and after a cycle test including repeating 0.5 CCC charge with an upper limit of 4.2V and 0.5 CCC discharge with a lower limit of 2.8 V was repeated 500 times. Each of IV0 and IV1 was a value obtained by multiplying the measured value by 10 according to the damping ratio of the probe. The cell voltage was adjusted to 3.75V, and the potential of the metal layer was measured as a potential difference (IV) between the positive electrode and the metal layer of the exterior body.

Example 2

Example 2 differs from Example 1 in that the power generation element is a wound body. The wound body was produced by winding 7 times a laminate in which a negative electrode, a separator, a positive electrode, and a separator were laminated in this order such that the negative electrode formed the outermost periphery. Other conditions were the same as in Example 1, and an initial potential IV0 and a potential IV1 of the metal layer were measured.

Examples 3 to 9

Examples 3 to 9 differ from Example 1 or 2 in that the frictional force between the mold and the exterior film is adjusted by changing the rubber material coated on the surface of the mold in the formation of a recessed portion of the exterior body. Example 7 differs from Example 1 in that the negative electrode terminal is covered with an insulating protective film (insulating tape). Table 1 shows whether the power generation element is a laminate or a wound body, and the relationship between the average thickness t1 of the first part and the average thickness t2 of the second part of the exterior body. Other conditions were the same as in Example 1, and an initial potential IV0 and a potential IV1 of the metal layer were measured.

Example 10

Example 10 differs from Example 5 in that the outermost layer of the power generation element (laminate) is a separator. That is, in Example 10, separators were disposed on both sides of the power generation element of Example 5. The relationship between the average thickness t1 of the first part and the average thickness t2 of the second part of the exterior body of Example 10 is shown in Table 1. Other conditions were the same as in Example 1, and an initial potential IV0 and a potential IV1 of the metal layer were measured.

Example 11

In Example 11, the production was performed in the same manner as in Example 8, except that for the negative electrode active material layer, 66.5 parts by mass of graphite (active material), 28.5 parts by mass of silicon oxide (active material), 1 part by mass of carbon (conductive material), 1.5 parts by mass of styrene butadiene rubber (SBR, binder), and 2.5 parts by mass of carboxymethyl cellulose (CMC, binder) were used. Other conditions were the same as in Example 1, and an initial potential IV0 and a potential IV1 of the metal layer were measured.

Example 12

In Example 12, the production was performed in the same manner as in Example 8, except that for the negative electrode active material layer, 88 parts by mass of silicon oxide (active material), 2 parts by mass of carbon (conductive material), and 10 parts by mass of polyamideimide (PAI, binder) were used, and the completed negative electrode was heat-treated for 3 hours at 350° C. in a vacuum. Other conditions were the same as in Example 1, and an initial potential IV0 and a potential IV1 of the metal layer were measured.

Example 13

In Example 13, the production was performed in the same manner as in Example 8, except that metallic lithium was used for the negative electrode active material layer. Other conditions were the same as in Example 1, and an initial potential IV0 and a potential IV1 of the metal layer were measured.

Comparative Example 1

Comparative Example 1 differs from Example 1 in that the surface of the mold is not covered in the formation of the recessed portion of the exterior body. The average thickness t1 of the first part and the average thickness t2 of the second part of the exterior body satisfied a relationship of t2/t1=0.995. Other conditions were the same as in Example 1, and an initial potential IV0 and a potential IV1 of the metal layer were measured.

Comparative Example 2

Comparative Example 2 differs from Example 2 in that the surface of the mold is not covered in the formation of the recessed portion of the exterior body. The average thickness t1 of the first part and the average thickness t2 of the second part of the exterior body satisfied a relationship of t2/t1=0.995. Other conditions were the same as in Example 2, and an initial potential IV0 and a potential IV1 of the metal layer were measured.

Comparative Example 3

In Comparative Example 3, the production was performed in the same manner as in Comparative Example 1, except that for the negative electrode active material layer, 66.5 parts by mass of graphite (active material), 28.5 parts by mass of silicon oxide (active material), 1 part by mass of carbon (conductive material), 1.5 parts by mass of styrene butadiene rubber (SBR, binder), and 2.5 parts by mass of carboxymethyl cellulose (CMC, binder) were used. Other conditions were the same as in Comparative Example 1, and an initial potential IV0 and a potential IV1 of the metal layer were measured.

Comparative Example 4

In Comparative Example 4, the production was performed in the same manner as in Comparative Example 1, except that for the negative electrode active material layer, 88 parts by mass of silicon oxide (active material), 2 parts by mass of carbon (conductive material), and 10 parts by mass of polyamideimide (PAI, binder) were used, and the completed negative electrode was heat-treated for 3 hours at 350° C. in a vacuum. Other conditions were the same as in Comparative Example 1, and an initial potential IV0 and a potential IV1 of the metal layer were measured.

Comparative Example 5

In Comparative Example 5, the production was performed in the same manner as in Comparative Example 1, except that metallic lithium was used for the negative electrode active material layer. Other conditions were the same as in Comparative Example 1, and an initial potential IV0 and a potential IV1 of the metal layer were measured.

than that of the positive electrode, the metal layer does not react with the electrolytic liquid which enters from a small crack generated in the inner surface resin layer during repeated charge and discharge, and the metal layer is not corroded.

The potential difference (IV1) between the positive electrode and the metal layer of the exterior body after 1 second is increased in a case where t2/t1 is less than 0.750 (Ex-

TABLE 1

| | | | | | Immediately After Production of Cell | | After 500 Cycles |
|---|---|---|---|---|---|---|---|
| | Configuration of Power Generation Element | t2/t1 | Insulating Tape | Negative Electrode Active Material | Initial Potential (IV0) | Potential IV1 After 1 Second | Potential IV1 After 1 Second |
| Example 1 | Laminate | 0.700 | Absence | Graphite | 1.8 | 0.50 | 0.53 |
| Example 2 | Wound Body | 0.700 | Absence | Graphite | 1.9 | 0.50 | 0.54 |
| Example 3 | Laminate | 0.750 | Absence | Graphite | 2.1 | 0.05 | 0.08 |
| Example 4 | Wound Body | 0.750 | Absence | Graphite | 2.2 | 0.05 | 0.09 |
| Example 5 | Laminate | 0.980 | Absence | Graphite | 2.5 | 0.01 | 0.01 |
| Example 6 | Wound Body | 0.980 | Absence | Graphite | 2.6 | 0.01 | 0.01 |
| Example 7 | Laminate | 0.980 | Presence | Graphite | 2.3 | 0.01 | 0.01 |
| Example 8 | Laminate | 0.990 | Absence | Graphite | 2.8 | 0.01 | 0.01 |
| Example 9 | Wound Body | 0.990 | Absence | Graphite | 2.9 | 0.01 | 0.01 |
| Example 10 | Laminate (Outermost Layer is Separator) | 0.980 | Absence | Graphite | 2.3 | 0.01 | 0.01 |
| Example 11 | Laminate | 0.990 | Absence | Graphite + SiO x 100 wt % | 2.8 | 0.01 | 0.10 |
| Example 12 | Laminate | 0.990 | Absence | SiO x 100 wt % | 2.8 | 0.01 | 0.13 |
| Example 13 | Laminate | 0.990 | Absence | Metallic Lithium | 2.8 | 0.01 | 0.15 |
| Comparative Example 1 | Laminate | *0.995* | Absence | Graphite | 3.2 | 0.01 | 0.65 |
| Comparative Example 2 | Wound Body | *0.995* | Absence | Graphite | 3.3 | 0.01 | 0.70 |
| Comparative Example 3 | Laminate | *0.995* | Absence | Graphite + SiO x 30 wt % | 3.2 | 0.01 | 0.90 |
| Comparative Example 4 | Laminate | *0.995* | Absence | SiO x 100 wt % | 3.2 | 0.01 | 1.95 |
| Comparative Example 5 | Laminate | *0.995* | Absence | Metallic Lithium | 3.2 | 0.01 | 2.50 |

Note)
In the table, the underline and italic font indicate that the numerical value is out of the range of the present invention.

The potential difference (IV0) between the positive electrode and the metal layer of the exterior body in an initial state was large in any of Comparative Examples 1 to 5. The fact that the potential difference between the positive electrode and the metal layer of the exterior body in an initial state is large means that the resistance Re between the positive electrode and the metal layer of the exterior body is large. That is, the potential of the metal layer is lower than that of the positive electrode. In addition, the potential difference (IV1) between the positive electrode and the metal layer of the exterior body after 500 cycles is large. From the above facts, it can be said that due to a low potential of the metal layer, the metal layer reacts with the electrolytic liquid which enters from a small crack generated in the inner surface resin layer during repeated charge and discharge, and the metal layer is corroded.

In contrast, in all of Examples 1 to 13, the initial potential IV0 is smaller than the initial potential IV0 of any of Comparative Examples 1 to 5. In addition, in all of Examples 1 to 13, the potential difference (IV1) immediately after the production of the cell is the same as or slightly larger than the potential difference (IV1) of any of Comparative Examples 1 to 5, and the potential difference (IV1) after 500 cycles is smaller than the potential difference (IV1) of any of Comparative Examples 1 to 6. From the above facts, it can be said that since the potential of the metal layer of the exterior body shown in Examples 1 to 13 is higher amples 1 and 2). In a case where the positive electrode and the metal layer of the exterior body are connected by an oscilloscope, a current flows through the internal resistance in the oscilloscope, and the potential difference is eliminated. The fact that the potential difference (IV1) remains even after one second has elapsed indicates that there is another cause of the potential difference, and indicates a concern that a crack is generated in part of the inner surface resin layer of the exterior body, and the metal layer is in contact with the electrolytic liquid. In a case where the initial potential IV0 is low although a crack is generated, corrosion does not occur immediately, and the potential difference (IV1) of about 0.50 V after 1 second is acceptable.

REFERENCE SIGNS LIST 1 negative electrode
1A negative electrode current collector
1B negative electrode active material layer
2 positive electrode
2A positive electrode current collector
2B positive electrode active material layer
3 separator
10 power generation element
20 terminal
21 negative electrode terminal
22 positive electrode terminal
30 exterior body 30A first surface
30B second surface
31 metal layer
301 first part
302 second part
32 inner surface resin layer
33 outer surface resin layer
35 exterior film
50 pressing jig
60 mold
61 rubber
100 non-aqueous electrolyte secondary battery
301 first part
302 second part
K accommodation space
t1, t2, M1, M2 average thickness

The invention claimed is:

1. A non-aqueous electrolyte secondary battery comprising:
   a power generation element wherein a positive electrode and a negative electrode are opposed to each other with a separator interposed therebetween, and the negative electrode is disposed on an outer side than the positive electrode; and
   an exterior body which covers the power generation element, and has a metal layer and a resin layer which covers both surfaces of the metal layer,
   wherein an average thickness $t1$ of a first part of the exterior body which covers upper and lower surfaces of the power generation element in a lamination direction of the power generation element and an average thickness $t2$ of a second part of the exterior body which covers side surfaces of the power generation element satisfy a relationship of $t2/t1<0.995$.

2. The non-aqueous electrolyte secondary battery according to claim 1,
   wherein the average thickness $t1$ of the first part and the average thickness $t2$ of the second part satisfy a relationship of $0.750 \leq t2/t1 < 0.995$.

3. The non-aqueous electrolyte secondary battery according to claim 1,
   wherein the average thickness $t1$ of the first part and the average thickness $t2$ of the second part satisfy a relationship of $t2/t1 \leq 0.980$.

4. The non-aqueous electrolyte secondary battery according to claim 1, further comprising:
   a negative electrode terminal which includes a first end portion which is connected to the negative electrode, and a second end portion which extends from the exterior body,
   wherein at least part of the negative electrode terminal is covered with an insulating tape.

5. The non-aqueous electrolyte secondary battery according to claim 1,
   wherein the average thickness $t1$ of the first part and the average thickness $t2$ of the second part satisfy a relationship of $0.50 \leq t2/t1 < 0.995$.

6. The non-aqueous electrolyte secondary battery according to claim 1, wherein
   the power generation element is a laminate in which the positive electrode, the negative electrode and the separator are laminated in this order, wherein the first part of the exterior body faces a main surface of the negative electrode.

7. The non-aqueous electrolyte secondary battery according to claim 1, wherein
   the power generation element is a flat wound body, wherein the upper and lower surfaces of the power generation element are flat surfaces located on both sides of the wound body, and the side surface thereof is a surface located in the central axis direction of the wound body.

8. The non-aqueous electrolyte secondary battery according to claim 1, wherein
   the power generation element is a wound body wound concentrically, wherein the upper surface of the power generation element is one arc surface when the wound body is cut at a plane orthogonal to the lamination direction and passing through a central axis thereof, and the lower surface is the other arc surface.

9. The non-aqueous electrolyte secondary battery according to claim 1, wherein the first part and the second part of the exterior body are flat parts.

10. The non-aqueous electrolyte secondary battery according to claim 1, wherein the first part and the second part of the exterior body do not include a curved portion of the exterior body which covers a corner portion of the power generation element.

11. The non-aqueous electrolyte secondary battery according to claim 1, wherein the metal layer is made of aluminum.

12. The non-aqueous electrolyte secondary battery according to claim 1, wherein the resin layer includes an inner surface resin layer and an outer surface resin layer, wherein
   the inner surface resin layer is made of polypropylene or polyethylene, and
   the outer surface resin layer is made of polypropylene, polyethylene terephthalate, polyamide or nylon.

* * * * *